(12) United States Patent
Jansen

(10) Patent No.: US 6,181,116 B1
(45) Date of Patent: Jan. 30, 2001

(54) POWER REGULATOR

(75) Inventor: Arian M. Jansen, Thousand Oaks, CA (US)

(73) Assignee: NMB U.S.A. Inc., Chatsworth, CA (US)

( * ) Notice: Under 35 U.S.C. 154(b), the term of this patent shall be extended for 0 days.

(21) Appl. No.: 09/083,760

(22) Filed: May 22, 1998

(51) Int. Cl.$^7$ ............................. G05F 1/24; H02M 3/335
(52) U.S. Cl. ............................. 323/261; 363/16; 363/91
(58) Field of Search .................................... 323/302, 301, 323/261, 251, 247; 363/45, 46, 47, 48, 16, 90, 91, 21

(56) References Cited

U.S. PATENT DOCUMENTS

| | | |
|---|---|---|
| 4,323,959 | 4/1982 | Check . |
| 4,631,652 | 12/1986 | Wendt . |
| 4,642,745 | 2/1987 | Steigerwald et al. . |
| 4,692,851 | 9/1987 | Attwood . |
| 4,922,397 | 5/1990 | Heyman . |
| 4,930,063 * | 5/1990 | Henze et al. ......................... 363/16 |
| 4,959,766 | 9/1990 | Jain . |
| 5,065,301 | 11/1991 | Shioy et al. . |
| 5,121,315 | 6/1992 | Moriya . |
| 5,373,432 | 12/1994 | Vollin et al. . |
| 5,396,410 | 3/1995 | Okochi et al. . |
| 5,625,538 | 4/1997 | Lee et al. . |
| 5,737,203 | 4/1998 | Barrett . |

OTHER PUBLICATIONS

Steigerwald, Robert L., "High–Frequency Resonant Transistor DC–DC Converters", IEE Transactions on Industrial Electronics, vol. IE 31, No. 2, May 1984. pp. 181–191.
London, Eric, "Practical Transformer Design Handbook", Indianapolis, Indiana, 1980, pp. 93–96.

* cited by examiner

Primary Examiner—Peter S. Wong
Assistant Examiner—Rajnikant B. Patel
(74) Attorney, Agent, or Firm—Amster, Rothstein & Ebenstein

(57) ABSTRACT

A power regulator is provided which employs a resonant circuit and permits regulation between a certain maximum value and zero. A series resonant circuit is adjusted to regulate power by adjusting the correspondence between the resonance frequency and the frequency of the voltage source such as an AC source delivering a sine wave or a square wave. Further, the output voltage is regulated to be lower than the voltage of the AC source when output current is zero. A capacitance is connected in parallel with the output of the power regulator to form a second resonant circuit with the inductance of the series resonant circuit. A method of power regulation is also contemplated.

28 Claims, 9 Drawing Sheets

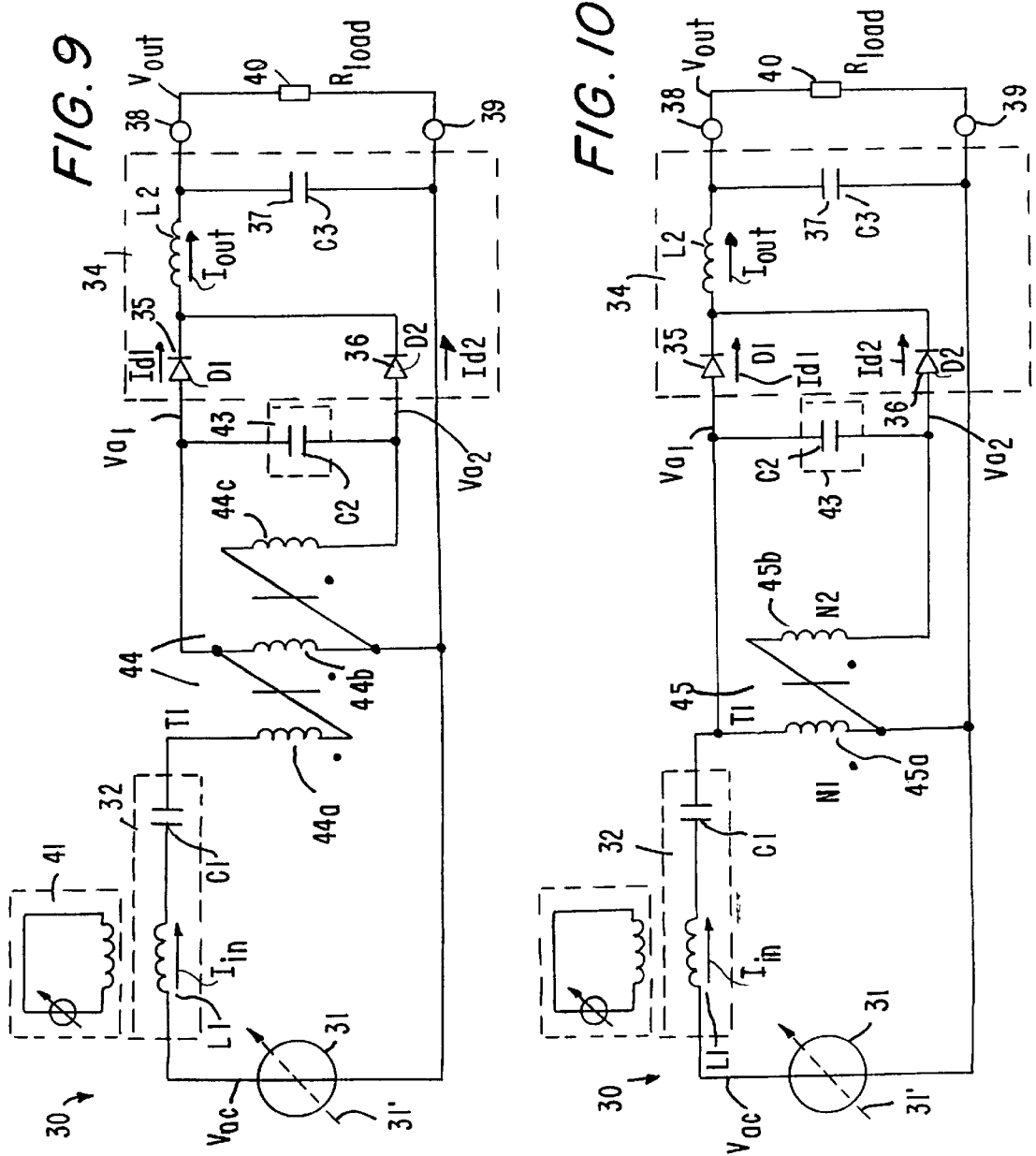

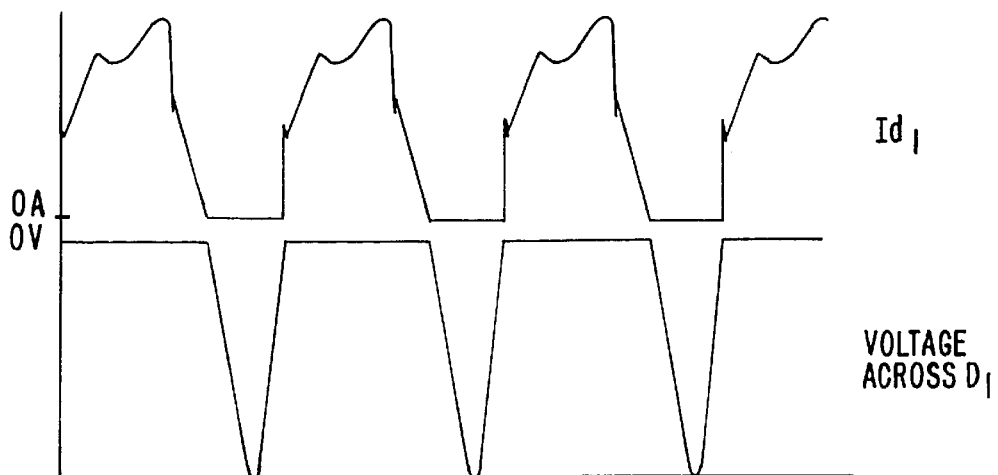
FIG. 12
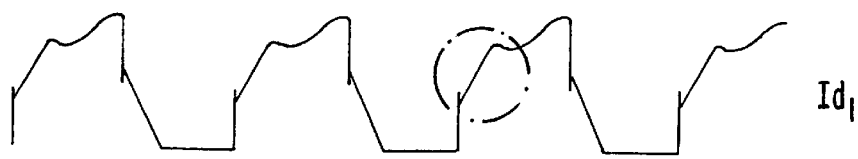
FIG. 13
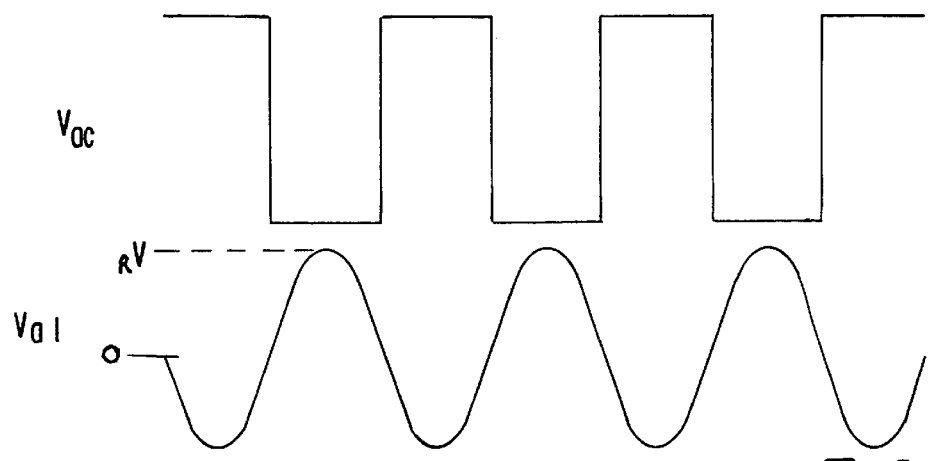
FIG. 14

POWER REGULATOR

FIELD OF THE INVENTION

This invention relates to a power regulator and a method of regulating power. In particular, the invention relates to a power regulator in which power regulation is achieved by either changing the frequency of an AC source closer to or farther away from the resonance frequency of a tuned circuit, or where there is a fixed frequency AC source, by changing the resonance frequency of a tuned circuit closer to or away from the frequency of the AC source.

BACKGROUND OF THE INVENTION

Several methods are known for regulating the output power of a power supply. In switched mode power supplies, regulation by means of pulse width modulation is the most common method used. Another method of regulating output power is the use of a tuned circuit in series with an AC voltage source. The tuned circuit includes an inductance and a capacitor and has a resonance frequency associated with it. FIG. 1 shows the attenuation curve of a series connection of an inductance L and a capacitance C acting as an LC filter as a function of frequency. The resonance frequency Fres of the inductance L and the capacitance C is given by Equation 1 for the simplest circuit that can be used for power regulation to a resistance load employing a resonant circuit (an LC filter):

$$\text{Fres} = 1/(2\pi\sqrt{LC}) \quad \text{(Eq. 1)}$$

By definition, the attenuation at the frequency Fres is 1, meaning that all energy passes through the circuit and there is maximum power. In the regions adjacent the resonance frequency Fres, only a portion of the energy passes through.

Power output to a load resistance from an LC filter may be regulated by adjusting the correspondence between the frequency of an AC source and the frequency of the resonant circuit formed of the LC filter with inductance L and capacitance C. The correspondence between the frequency of an AC source and the frequency of a resonant circuit may be adjusted by either changing the frequency of the AC source closer to or farther away from the resonance frequency of the resonant circuit, or, in the case of a fixed frequency AC source, by changing the resonance frequency of the resonant circuit closer to or away from the frequency of the AC source. FIG. 2 illustrates attenuation curves for power regulation accomplished by changing the resonance frequency of a resonant circuit closer to or farther away from the AC source. More particularly, in FIG. 2, Fac is the frequency of the AC source signal. Fres.1 is the attenuation curve of an LC filter, as in FIG. 1. The point A where the frequency of the AC source Fac crosses the attenuation curve for the LC filter having a resonance frequency Fres.1, illustrates the amount of attenuation of the frequency of the AC source Fac that is achieved by the LC filter. In the situation illustrated, the amplitude of the signal after the LC filter is reduced by the LC filter to about 15% of the amplitude of the frequency of the AC source Fac as shown by point A.

However, if the curve of the resonance frequency is moved in the direction of the frequency of the AC source Fac, the attenuation of the frequency of the AC source Fac by the LC filter changes, and the voltage output amplitude rises, increasing the power output. The curve of the resonance frequency may be moved in the direction of the frequency of the AC source Fac by changing one or both of the values of the inductance L and the capacitance C in accordance with Equation 1 above. In FIG. 2, this shift is illustrated by moving the curve of the resonance frequency Fres.1 in the direction of the horizontal arrow to a new resonance frequency Fres.2. The point B where the frequency of the AC source Fac crosses the new attenuation curve shows that the signal after the LC filter is increased to about 90% of the amplitude of the frequency of the AC source signal Fac as shown by the vertical arrow. Thus, the output voltage and hence the output power are increased. By changing the resonance frequency of the inductance L and the capacitance C of the resonant circuit, the output power delivered by the power supply to a load resistance can be regulated.

A second method of power regulation is achieved by changing the frequency of an AC source closer to or farther away from the resonance frequence of a resonant circuit. FIG. 3 illustrates this method graphically where the resonance frequency Fres is kept constant, while the graph of frequency of the AC source is varied from Fac1 to Fac2 in the direction of the horizontal arrow. For the first frequency of the AC source Fac1, the point of crossing of the attenuation curve and Fac1 results in an amplitude after the LC filter of about 15% of the amplitude of the frequency of the AC source Fac. When the frequency of the AC source is decreased as indicated by the horizontal arrow to the value Fac2, the attenuation of the frequency of the AC source by the LC filter changes and the output amplitude rises. At the new frequency of the AC source Fac2, the point B of crossing of the attenuation curve increases to about 90% of the amplitude of the frequency of the AC source as shown by the vertical arrow. Accordingly, the output voltage and the output power to a load resistance is increased. By changing the frequency of the AC source from Fac1 to Fac2, power can be regulated.

FIG. 4 shows a prior art power regulator for supplying power to a resistance load which performs power regulation by a resonant circuit which is more complicated than just the LC filter discussed above. More particularly, the power regulator 10 illustrated in FIG. 4 has an AC source 11, a resonant circuit 12, an isolation transformer 13, rectifying means 14, and an output across terminals 18 and 19 for connecting to the load resistor $R_{load}$ 20. The resonant circuit 12 includes an inductance L and a capacitance C. The rectifier means 14 is a rectifier and includes a diode circuit made up of diodes 15 and 16, and a smoothing capacitor 17. A circuit in accordance with prior art FIG. 4 is disclosed in U.S. Pat. No. 4,930,063, issued to Henze et al. on May 29, 1990, and includes a variable inductor for the inductance L of the resonant circuit. Accordingly, in the Henze et al. regulator for a power supply, the resonance frequency is varied by varying the inductance of the resonant circuit in order to regulate power. An attenuation curve similar to that of FIG. 1 may be obtained for the prior art circuit in the Henze et al. Patent, and power regulation may be obtained by changing the resonance frequency of the resonant circuit in a manner similar to that graphically illustrated in FIG. 2.

Several disadvantages are associated with the prior art circuits for power regulation employing resonant circuits. As illustrated in the attenuation curves of FIGS. 1–3, the attenuation curve for each circuit approaches but never equals zero amplitude of the frequency of the AC source. The output power can never equal zero. This is because the attenuation of the LC filters of the prior art circuits would have to be substantially infinitely high in order to regulate to a voltage lower than the AC source voltage when the current at the output of a circuit is equal to essentially zero and the resistance of the load connected to the circuit is substantially infinite. A minimum power output can only occur at substantially an infinitely high source frequency or at substantially an infinitely large inductance L. Further, the diodes in the rectifier result in significant recovery losses due to significant instantaneous reverse voltages immediately after recovery. In prior art circuits, the voltages across the diodes of the rectifier are subject to sharp transitions. Further, the prior art circuits are subject to parasitic effects from the leakage inductance of the isolation transformer, the winding capacitances of the isolation transformer, and capacitances associated with the diodes of the rectifier. Further, isolation transformers are associated with power dissipation due to the resistance of the copper windings referred to as copper losses of the windings.

There is therefore a need for a power regulator that regulates power by adjusting the correspondence between the frequency of an AC source and the resonance frequency of a resonant circuit which permits power regulation between a maximum value and a minimum value of zero. Further, there is a need for a power regulator employing a resonant circuit that reduces the recovery loss in diodes employed in the rectifier. Additionally, there is a need for a power regulator that regulates power by employing a resonant circuit that reduces or eliminates the parasitic effects due to transformer leakage, copper losses of transformer windings, unwanted winding capacitances associated with a transformer, and unwanted capacitances associated with diodes in the rectifier means.

SUMMARY OF THE INVENTION

It is an object of the invention to provide a power regulator which regulates output power employing a series resonant circuit which can regulate power between a maximum value and a minimum value of zero or essentially zero.

A further object of the invention is to provide a power regulator which regulates power employing a series resonant circuit that reduces the recovery loss associated with diodes in the rectifier.

It is a further object of the invention to provide a power regulator which regulates power employing a series resonant circuit that reduces the parasitic effects of leakage inductance of a transformer of the power regulator.

It is still a further object of the invention to provide a power regulator which regulates power employing a series resonant circuit that reduces the parasitic effects of winding capacitances of a transformer of the power regulator.

Additionally, it is an object of the invention to provide a power regulator that regulates power employing a series resonant circuit that reduces the parasitic effects of capacitances associated with diodes of the rectifier of the power regulator.

It is still another object of the invention to provide a power regulator which regulates power employing a series resonant circuit that reduces copper losses associated with the windings of a transformer of the power regulator.

These and other objects of the invention are accomplished by providing a power regulator comprising: an AC source having a voltage and a frequency; an output having an output voltage $V_{out}$; a first resonant circuit comprising a first inductance L1 and a first capacitance C1 connected in series to the AC source, and having a first resonance frequency; means for adjusting the correspondence between the frequency of the AC source and the first resonance frequency of the first resonant circuit in order to regulate power; and means for regulating to an output voltage lower than the voltage of the AC source when there is essentially zero output current.

In a preferred embodiment of the power regulator the means for regulating comprises a second capacitance C2 connected in parallel with the output to form a second resonant circuit with the first inductance L1.

These objects are further accomplished by providing a power regulator comprising: an AC source having a voltage and a frequency; an output having an output voltage $V_{out}$; a first resonant circuit comprising a first inductance L1 and a first capacitance C1 connected in series to the AC source, and having a first resonance frequency; means for adjusting the correspondence between the frequency of the AC source and the first resonance frequency of the first resonant circuit in order to regulate power; and a second capacitance C2 connected in parallel with the output to form a second resonant circuit with the first inductance L1.

Also disclosed is a method of regulating power comprising: adjusting the correspondence between a frequency of an AC source and a resonance frequency of a first resonant circuit comprising a first inductance L1 and a first capacitance C1 connected in series to the AC source to regulate power at an output; and regulating the output voltage of the power regulator to a value lower than the voltage of the AC source when there is essentially zero current at the output.

The above and other objects, aspects, features and advantages of the invention will be more readily apparent from the description of the preferred embodiments thereof taken in conjunction with the accompanying drawings and appended claims.

BRIEF DESCRIPTION OF THE DRAWINGS

The invention is illustrated byway of example and not limitation in the figures of the accompanying drawings in which like references denote like or corresponding parts, and in which:

FIG. 9 is a power regulator in accordance with a fifth embodiment of the invention;

FIG. 10 is a power regulator in accordance with a sixth embodiment of the invention;

FIG. 12 shows the waveforms of Id1 and the voltage across the diode D1 for the embodiments of the invention illustrated in FIGS. 7–10;

FIG. 13 shows the waveforms of Id1 and Id2 for the embodiments of the invention illustrated in FIGS. 7–10 above emphasizing the slow rate of change in the current of the diodes D1 and D2;

FIG. 14 shows the waveforms of the source voltage and the voltage at Va1 when L1 is increased and the load resistance is at infinity;

DESCRIPTION OF THE PREFERRED EMBODIMENTS

Figure 1:
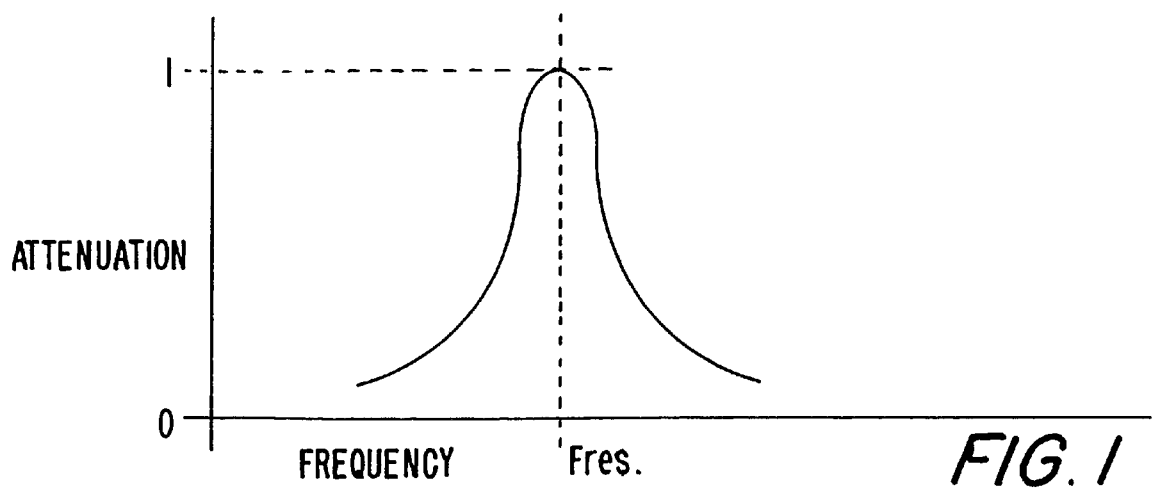
FIG. 1 illustrates an attenuation curve for an LC filter according to the prior art.
Figure 2:
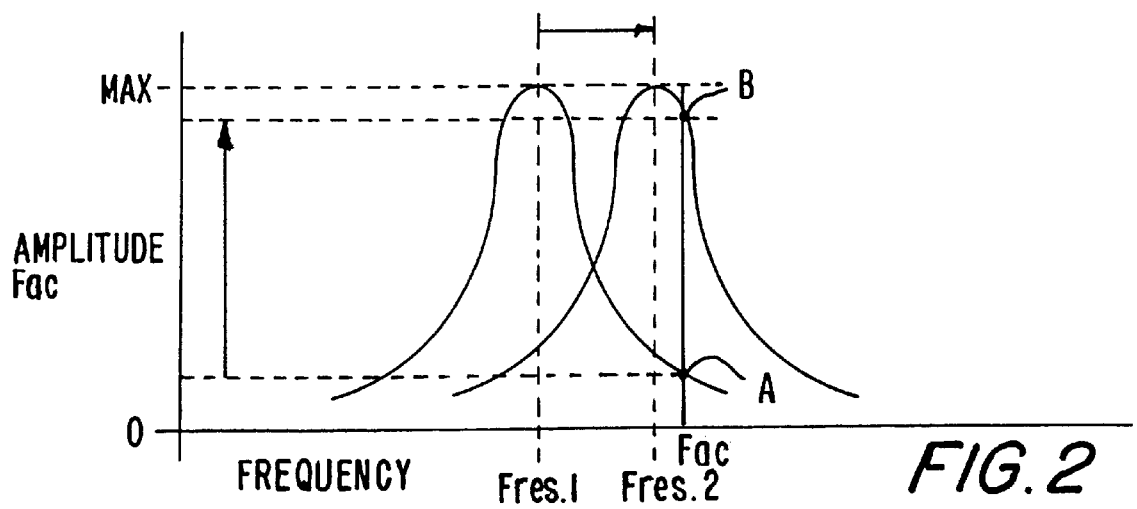
FIG. 2 illustrates the change in attenuation curves when the resonance frequency is adjusted to regulate power in accordance with the prior art.
Figure 3:
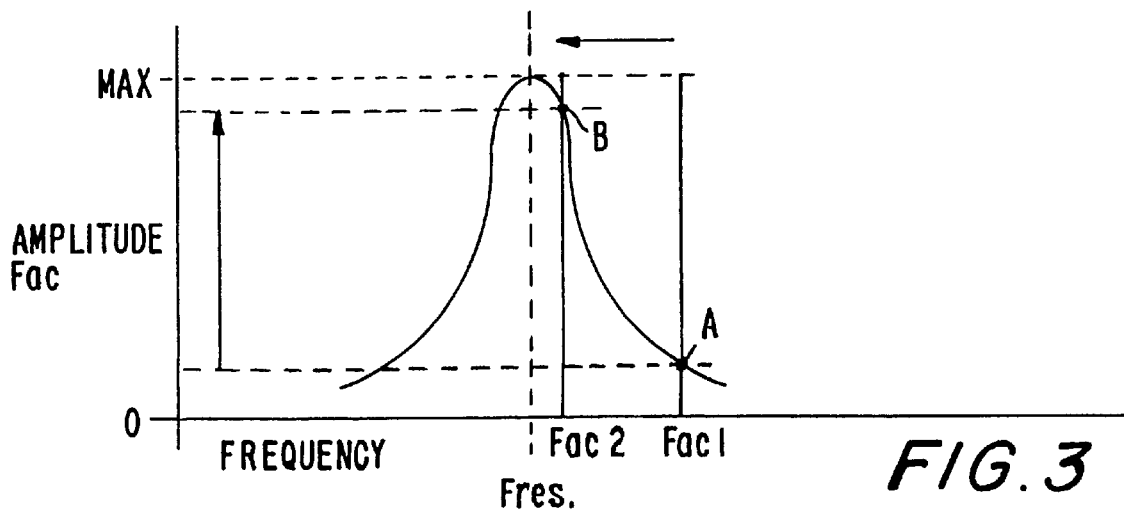
FIG. 3 illustrates the change in crossing points of the attenuation curve when an AC source frequency is varied to regulate power in accordance with the prior art.
Figure 4:
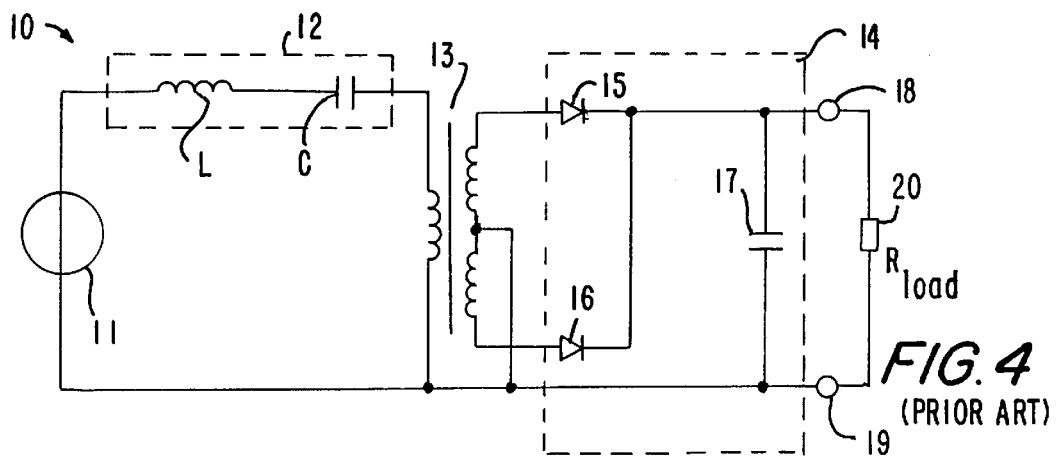
FIG. 4 is a power regulator in accordance with the prior art.
Figure 5:
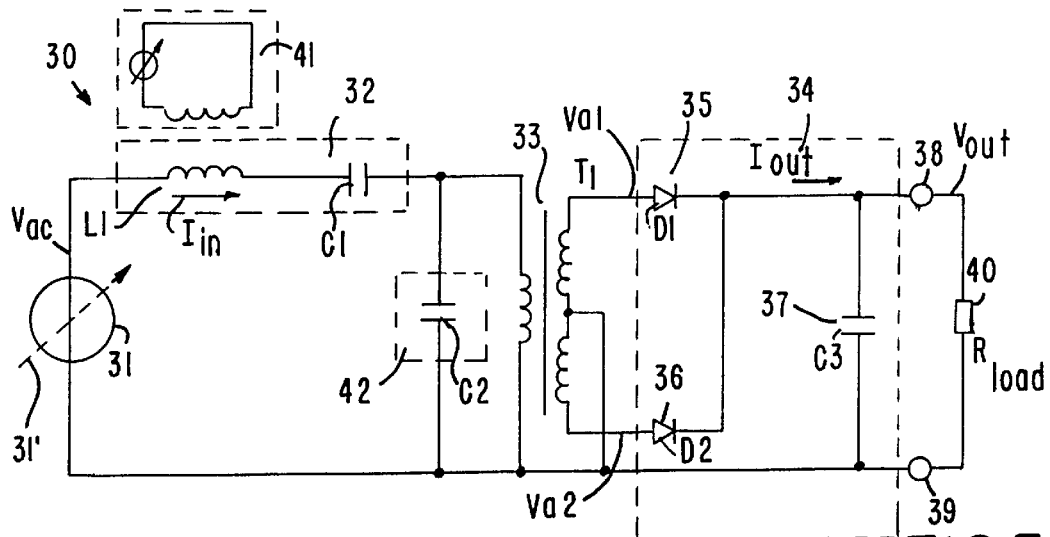
FIG. 5 is a power regulator in accordance with a first embodiment of the invention.

Referring to FIG. 5 a power regulator 30 in accordance with a first embodiment of the invention supplies power to a resistance load $R_{load}$ 40 and performs power regulation by a series resonant circuit 32. More particularly, the power regulator 30 illustrated in FIG. 5 has a source of voltage which is an AC source 31 of a sine wave or a square wave. The shape of the AC source waveform is not important to the voltages and currents that are obtained by the regulator. The resonant series circuit 32 includes inductance L1 and capacitance C1. The circuit further includes an isolation transformer 33 and rectifier means 34 for providing a DC output at terminals 38 and 39 of the power regulator. The resistance load 40 is connected across the output at terminals 38 and 39. The rectifier means 34 is a rectifier which includes a diode circuit made up of diodes 35 and 36 (D1 and D2), and a smoothing capacitor 37 (C3). The voltage source 31 has a voltage Vac and a frequency Fac. The output across terminals 38 and 39 has an output voltage $V_{out}$. The resonant circuit 32 includes the inductance L1 and the capacitance C1 connected in series to the AC source and has a resonance frequency Fres.

In the embodiment illustrated in FIG. 5, the resonance frequency of the resonant circuit 32 may be changed by changing the inductance L1 which is illustrated in the figure as a variable inductance. Alternatively, the capacitance C1 may be variable in order to change the resonance frequency of the resonant circuit 32. Further, both the inductance L1 and the capacitance C1 may be changed to change the resonance frequency of the resonant circuit 32. Changing the resonance frequency of the resonant circuit 32 is one manner of adjusting the correspondence between the frequency of the AC source 31 and the resonance frequency Fres of the resonant circuit 32 in order to regulate the power of the power regulator 30. Thus, the illustrated means 41 for adjusting the inductance L1 of the resonant circuit may be considered a means for adjusting the correspondence between the frequency of the AC source 31 and the resonance frequency Fres of the resonant circuit 32. Additionally, any known means for varying the capacitance C1 may be considered a means for adjusting the correspondence between the frequency of the AC source 31 and the resonance frequency Fres of the resonant circuit 32 in order to regulate power. Alternatively, the correspondence between the frequency of the AC source and the resonance frequency of the resonant circuit 32 may be adjusted employing a variable AC source, illustrated in FIG. 5 by the dashed arrow 31'. Accordingly, the circuitry within the variable AC source 31' that varies the signal frequency may be considered a means for adjusting the correspondence between the frequency of the AC source and the resonance frequency Fres of the resonant circuit 32. In another alternative, the correspondence between the frequency of the AC source 31 and the resonance frequency Fres of the resonant circuit 32 may be adjusted employing a variable AC source frequency and/or any known means for varying the inductance L1 and the capacitance C1 combined.

The first embodiment illustrated in FIG. 5 further includes the capacitor C2, which is connected in parallel with the output across output terminals 38 and 39 and forms a second resonant circuit with the inductance L1 of the first resonant circuit 32. The capacitance C2 is connected on the primary side of the isolation transformer 33 and permits regulating to an output voltage lower than the voltage of the AC source when there is essentially zero output current. Accordingly, the capacitance C2 permits the power regulator 30 to obtain an output power of essentially zero.

The transformer 33 has a primary winding and at least one secondary winding with a center tab that is connected to the output terminal 39. The outputs of each end of the secondary winding are rectified by a diode circuit of rectifier means 34 including diodes 35 and 36 to deliver a DC output current Iout and output voltage $V_{out}$. The rectifier means 34 further includes a smoothing capacitor 37 (C3). The transformer 33 has associated therewith a leakage inductance T1.

In operation, the first embodiment of the invention includes a resonant circuit 32 having an inductance L1 and a capacitance C1 connected in series to an AC source. Power is regulated by adjusting the correspondence between the frequency of the AC source Fac and a resonance frequency of the resonant circuit Fres. Further, the output voltage is regulated to a value lower than the voltage of the AC source when there is substantially zero current at the output. A parallel capacitance C2 is added to regulate the output voltage to a value that is lower than the voltage of the AC source when the output current is essentially zero. The capacitance C2 is connected across the primary winding of the transformer 33. The capacitance C2 forms a second resonant circuit with the inductance L1 of the resonant circuit 32. The use of a second resonant circuit permits the second resonant circuit to act as low-pass filter when the output current is essentially zero.

The impedance of the primary winding of the transformer 33 at the frequency of the AC source is many times higher than the impedances of inductance L1, capacitance C1 and capacitance C2. Accordingly, the impedance of the primary inductance is high enough to have a negligible influence on the resonance frequencies of the resonant circuit L1 and C1 and the resonant circuit L1 and C2. The values of the source frequency and the resonance frequency of the resonant circuit comprising L1 and C1 are set so that the resonance frequency Fres is placed just under the source frequency Fac, and the power is regulated by changing either the resonance frequency of the resonant circuit 32 or by changing the source frequency employing an optional variable AC source 31'. The operation is the same if the AC source frequency is placed below the resonance frequency of L1 and C1, however, power regulation is achieved on the positive slope of the LC filter.

The primary inductance of the transformer 33 is considered to be infinitely large in the equation for the resonance frequency of the circuit similar to Equation 1 above. Accordingly, the primary inductance of the transformer 33 is so large that the resonance with any capacitor in the circuit is at least a factor of ten below the resonance of the resonant circuit 32. Accordingly, the resonances of the primary winding of the transformer 33 with any of the capacitances in the circuit may be considered negligible. The presence of C2 permits the second resonant circuit, including inductance L1 and capacitance C2, to have a low-pass filter effect which can give sufficient attenuation at a finite and practical value for the source frequency and for the value of the inductance L1.

The circuit uses only the fundamental frequency of the voltage source. Accordingly, the AC signal from the voltage source is not limited to any specific waveform and may be a sine wave or a square wave. Reference may be made to the corresponding waveforms shown in FIGS. 11A and 11B for the embodiment with the specific values given for the circuit of FIG. 10.

To obtain minimum output power, the frequency of the AC source is caused to be the farthest away from the resonance frequency Fres of the resonant circuit 32. Assuming the case of a fixed frequency AC source, the value of inductance L1 is chosen high for a low resonance frequency of the resonant circuit formed by L1 and C1 so that the attenuation curve is far below the AC source frequency Fac. The large value of L1 also causes the resonance frequency of the resonant circuit formed by L1 and C2 to be below the frequency of the AC source Fac. The inductance L1 and the capacitance C2 form a low pass filter for the AC source frequency Fac. The values of the capacitors C1 and C2 are chosen in such a way that the positive peak voltages Va1 and Va2 at the anodes of the diodes D1 and D2 (34 and 35) are equal to or lower than the desired output voltage $V_{out}$ in order for the minimum output power to equal zero. More particularly, in order to achieve a zero power output at a given output voltage $V_{out}$, the peak voltage value Va1 at the anode of diode D1 must be equal to the output voltage $V_{out}$.

The criterion to reach a zero or essentially zero output power for a given output voltage $V_{out}$ is that the attenuation of the fundamental frequency of the AC source Fac caused by the low pass filter formed of inductance L1 and capacitance C2 is equal to the ratio of the peak amplitude of the fundamental frequency of the AC source and the output voltage $V_{out}$. The operation of the circuits is similar when the AC source frequency Fac is changed. The same waveforms for current and voltage are obtained.

Figure 6:
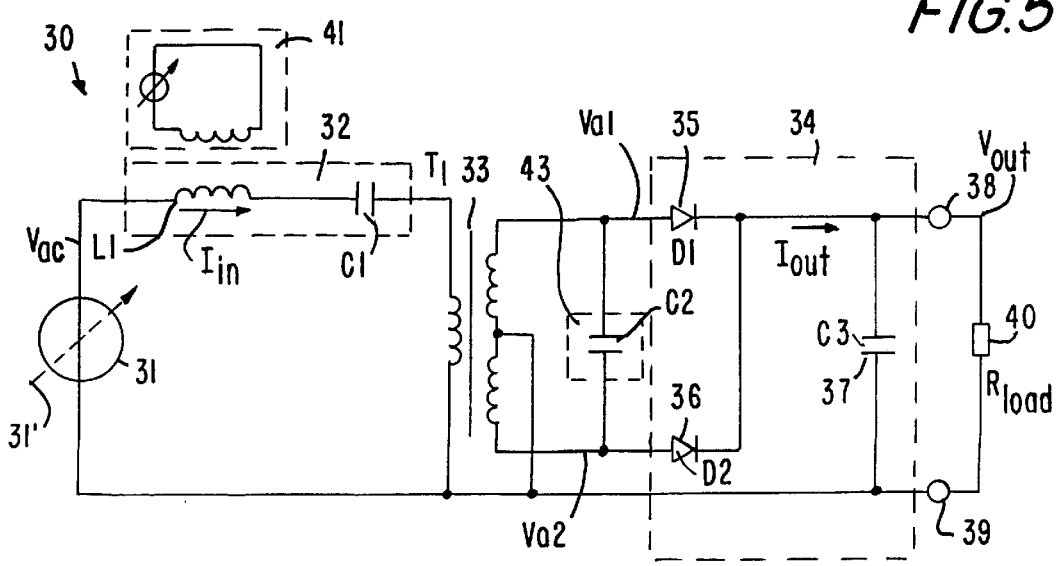
FIG. 6 is a power regulator in accordance with a second embodiment of the invention.

FIG. 6 is a second embodiment of the power regulator of the invention. The second capacitance C2 is placed at the secondary side of the transformer 33. More particularly, the capacitance C2 is connected across the secondary winding of transformer 33 with a terminal of the capacitance C2 connected to each of the anodes of the diodes D1 and D2. The leakage inductance T1 of the transformer 33 becomes part of the tuning circuit made up of the inductor L1, capacitor C1, the leakage inductance of the transformer T1 and the capacitance C2. The sum of the leakage inductance T1 of transformer 33 and the inductance of inductance L1 constitute the inductive part of the resonant circuits. Accordingly, the value of the inductance L1 may be set to compensate for the leakage inductance T1 of the transformer 33. Accordingly, the second embodiment of the invention reduces the influence of the leakage inductance T1 of the transformer 33.

Placing the capacitance C2 across the secondary side of the transformer 33 further permits the value of the capacitance C2 to be set to compensate for the winding capacitances of the isolation transformer. Further, the value of the capacitance C2 may be set to compensate for the capacitances associated with the diodes D1 and D2 of the rectifier means 34. The parasitic winding capacitances of the transformer 33 are fully across the capacitance C2 and therefore form a part of the value of the capacitance C2. Further, the junction capacitances of the diodes D1 and D2 are fully across the capacitance C2 and therefore are a part of the value of the capacitance C2 as well.

Figure 7:
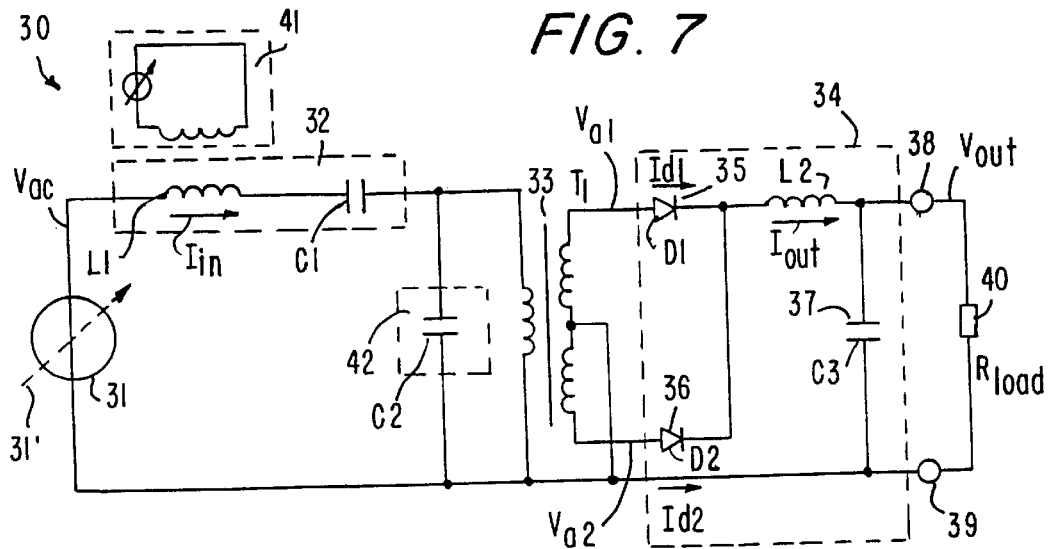
FIG. 7 is a power regulator in accordance with a third embodiment of the invention.

FIG. 7 is a third embodiment of the power regulator according to the invention. The third embodiment of the invention is similar to the first embodiment of the invention illustrated in FIG. 5, however, a series inductance L2 is added between the point of connection of the cathodes of the diodes D1 and D2 and the output terminal 38. Like references on FIG. 7 denote like or corresponding parts as in previous figures. However, in FIG. 7 the inductance L2 is added to the rectifier means 34. Just as in the first embodiment shown in FIG. 5, the tuning circuit is limited to the inductor L1 and the capacitances C1 and C2. The primary inductance of the transformer 33 and the inductance L2 are chosen to be high enough to have a minimum influence on the resonant circuits. More particularly, if the inductance L2 is set to a value that is so high that the waveform of the voltage of the signal delivered from diode D2 has little influence on the output current Iout through the inductance L2, the inductance L2 will hardly influence the resonance frequencies of the resonant circuits formed of inductance L1, and capacitances C1 and C2.

Figure 8:
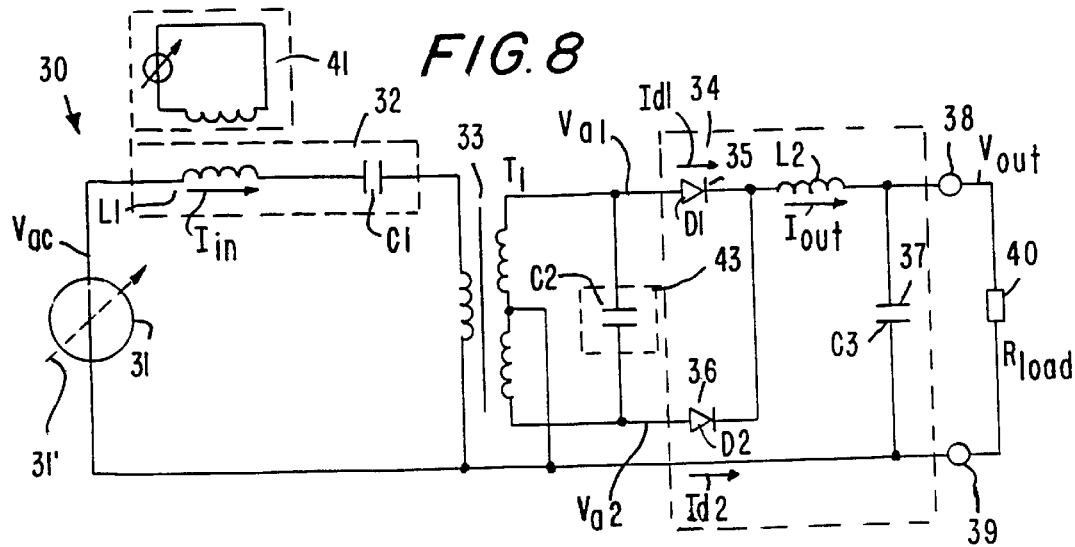
FIG. 8 is a power regulator in accordance with a fourth embodiment of the invention.

FIG. 8 is a power regulator according to a fourth embodiment of the invention. The power regulator illustrated in FIG. 8 is similar to that illustrated in FIG. 6 which places the capacitance C2 on the secondary side of the isolation transformer 33, however, the inductance L2 is added to the rectifier means 34 as in the embodiment illustrated in FIG. 7. The series inductance L2 reduces the recovery losses of the diodes D1 and D2 in the rectifier means 34. The inductance L2 serves the function of creating a high impedance for the AC voltage at the cathodes of the diodes D1 and D2 and a low impedance for the DC output.

In order to reduce the reverse recovery losses in the diodes of the rectifier, it is important that the diodes have as slow as possible a forward current transition and as slow as possible a reverse voltage transition. It is also necessary that each of the diodes only goes into reverse only once every period. FIGS. 12 and 13 show waveforms for the forward currents Id1 and Id2 through the diodes D1 and D2. FIG. 12 further shows the waveform for the voltage across the diodes for diode D1. FIG. 12 shows the slow forward current increase and decrease of D1 and the smooth increase of the reverse voltage across diode D1. The series inductance L2 causes the output current Iout to be a constant DC value (with a small AC-component) (see bottom waveforms of FIGS. 11A and 11B), and current to be gradually taken over from one diode to the other. This is highlighted by the circled portions of the waveforms of Id1 and Id2 of FIG. 13. After the current through the diode has reached zero, the reverse voltage rises smoothly as shown in the waveform of the voltage across diode D1 shown in FIG. 12. The slower the forward current in a diode is reduced, the smaller the recovery charge is. Further, less of that recovery charge is dissipated in heat, the slower the reverse voltage rises. Accordingly, there are less recovery losses.

Figure 16:
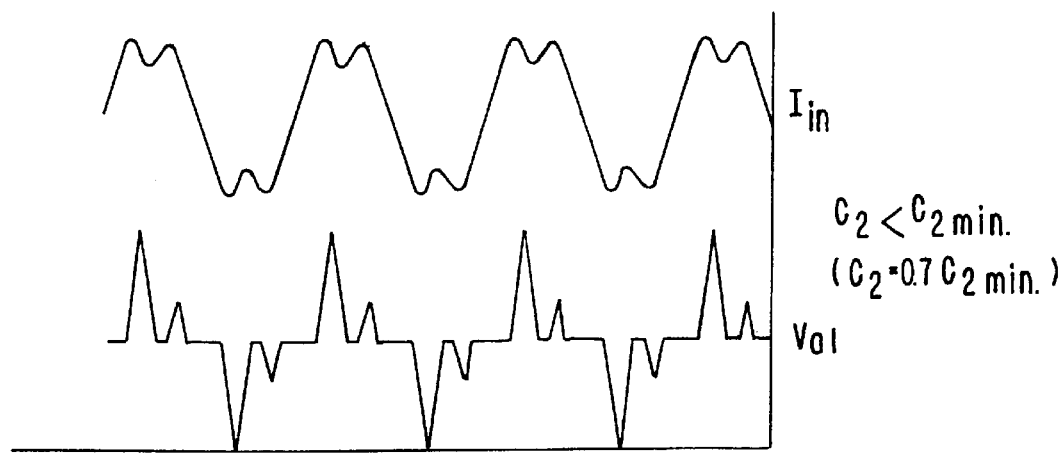
FIG. 16 shows the waveforms of Iin and Va1 where C2 is smaller than $C2_{min}$.

To achieve this mode of operation, a minimum value for C2 is required. If C2 is too small, the diodes will go into reverse (out of conduction) more than once per period causing the reverse recovery loss to occur more than once per period also. FIG. 16 shows the situation where C2 is 0.7 times the minimum value $C2_{min}$. The diodes go out of conduction twice per period resulting in unacceptably high recovery losses.

The determination of the minimum value of C2 is as follows:

Diodes D1 and D2 will cause a double sided rectification of current Iin, resulting in a DC output current Iout. If inductance L2 is assumed to be infinitely large, then the output current Iout is equal to the average value of the input current Iin, being:

$$\text{Iout}=\text{Iin}_{pk}((\Sigma_{o \to \pi}(\sin \Phi))/\pi) \Rightarrow \text{Iout}=\text{approx}.0.64\text{Iin}_{pk}. \quad \text{(Eq. 2)}$$

where Iin is assumed to be a perfect sine wave and $\phi$ is the frequency of the input.

If the momentary value of the input current Iin is below the output current Iout, both diodes D1 and D2 conduct. This is illustrated by the circled areas of FIG. 13 illustrating the forward currents Id1 and Id2 through the diodes D1 and D2. If the momentary value of the input current Iin exceeds the output current Iout, one of the diodes will go out of conduction and a 'half sine wave shaped' voltage waveform Va1 and Va2 occurs at the anodes of the diodes D1 and D2. This voltage waveform is determined by the resonance of capacitance C2 with inductance L1.

The resonance of the resonant circuit C2 and L1 will only occur when one of the diodes is not conducting, because when both diodes D1 and D2 are conducting, the capacitance C2 is short circuited by both of the conducting diodes, and hence the only resonance that then exists is due to inductance L1 and capacitance C1.

The exact formula for the resonance frequency of capacitance C2 is:

$$\text{FresC2}=1/(2\pi)(L1(C1(4)C2/(C1+4C2)))) \quad \text{(Eq. 3)}$$

The factor of 4 comes from the transformation ratio of the isolation transformer T1.

Since capacitance C2 is much smaller than capacitance C1, this equation can be simplified to:

$$\text{FresC2}=1/(4\pi(L1C2)) \quad \text{(Eq. 4)}$$

The criterion which must be met for setting the value of capacitance C2 is that during the time that the momentary value (rather than the RMS value) of the input current Iin is larger than the output current Iout, there may not be more than one full cycle of the resonance frequency FresC2. If there would be more than one cycle, the diodes would go out of conduction for more than once every period resulting in excessive recovery losses.

Given Equation 1, the input current Iin will be higher than the output current Iout when it reaches more than $0.64.\text{Iin}_{pk}$, the average value of the input current. Consequently, during approx. 100° of the 360° period, the input current Iin is higher than the output current Iout. This means that the maximum value of the resonance frequency FresC2 is 3.6 times the frequency of the voltage source Fac.

$$\text{FresC2max}=(360/100)\text{Fac} \quad \text{(Eq. 5)}$$

The minimum value for C2 is then:

$$C2_{min}=1/(16p^2(3.6)^2\text{Fac}^2L1)C2_{min}=\text{approx.} \\ 1/(204.7 \text{ Fac}^2L1) \quad \text{(Eq. 6)}$$

FIGS. 15, 16, 17 and 18 show waveforms for the input current Iin and the voltage Va1 at the anode of diode D1 for different values of capacitance C2.

Figure 15:
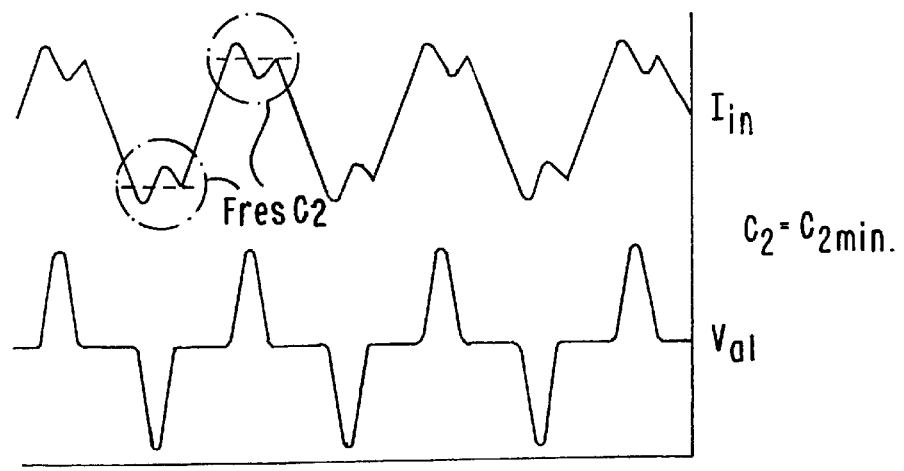
FIG. 15 shows the waveforms of Iin and Va1 where C2 is equal to $C2_{min}$.

FIG. 15 shows the situation where capacitance C2 is equal to $C2_{min}$. The waveform of the input current Iin shows clearly one full cycle of the resonance frequency FresC2 in the peaks of the fundamental frequency.

FIG. 16 shows the situation where capacitance C2 is smaller than $C2_{min}$. More particularly, $C2=0.7C2_{min}$. The waveform of the input current Iin shows more than a full cycle of the resonant frequency FresC2 and the waveform of the voltage Va1 shows two peaks in the place of one. The two peaks indicate that the diode goes out of conduction twice per cycle resulting in twice the recovery losses.

Figure 17:
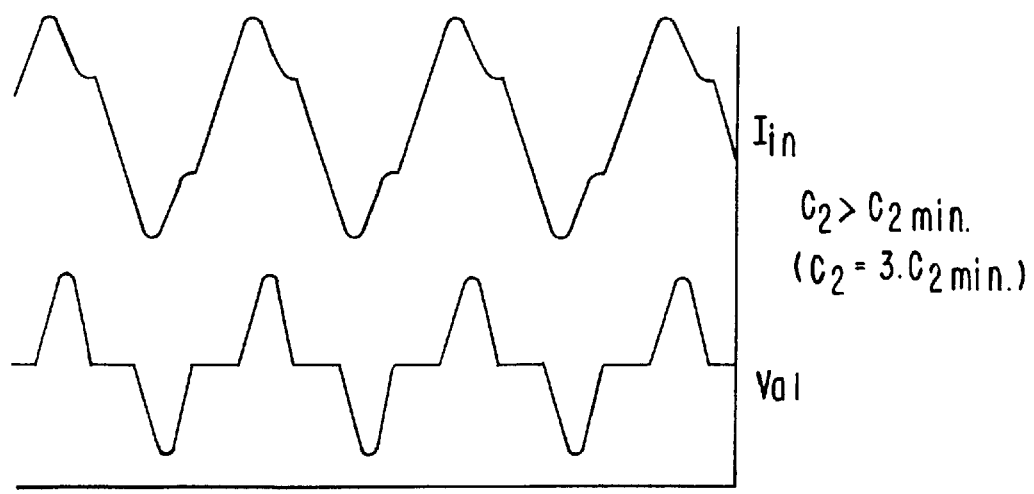
FIG. 17 shows the waveforms for Iin and Va1 where C2 is larger than $C2_{min}$.

FIG. 17 shows the situation where capacitance C2 is larger than $C2_{min}$. In FIG. 17 $C2=(3C2_{min})$. The waveform of Iin shows less than one full cycle of the resonant frequency FresC2.

Figure 18:
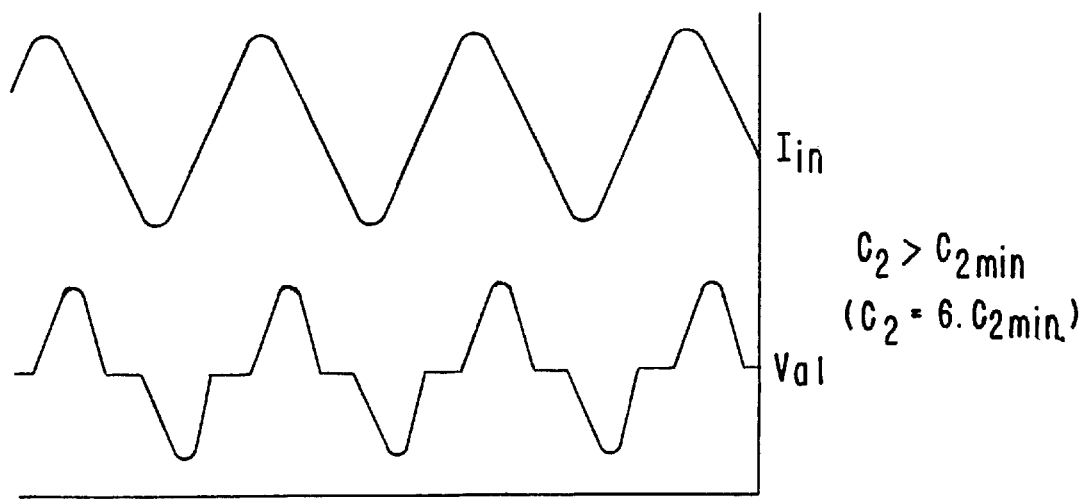
FIG. 18 shows the waveforms for Iin and Va1 where C2 is much larger than $C2_{min}$ in accordance with the waveforms illustrated in FIGS. 11A and 11B.

FIG. 18 shows the situation where capacitance C2 is much larger than $C2_{min}$. In FIG. 18 $C2=6C2_{min}$. The waveform of the input current Iin is close to a sine wave, because there is only about half a cycle of the resonance frequency FresC2 in the peaks of the input current Iin. The waveforms in FIGS. 11A and B were obtained setting the value of capacitance C2 much larger than $C2_{min}$.

Since inductance L1 is variable when the frequency of the voltage source Fac is constant, $C2_{min}$ has to be calculated for the minimum possible value of inductance L1.

FIG. 9 shows a fifth embodiment of the invention which is similar to that illustrated in FIG. 8 where like references denote corresponding parts, however, in FIG. 9 the transformer 33 is replaced with a transformer 44 having a multitude of identical transformer windings 44a, 44b and 44c, wound multifilar and connected in series. The use of the identical windings in series on the transformer and the multifilar winding method minimizes the leakage inductance T1 of the transformer 44 and reduces the copper loss of the windings of the transformer 44. In FIG. 9, the transformer 44 has three identical windings and is used to obtain a transformation ratio from input to output of 2:1.

FIG. 10 is a power regulator in accordance with the sixth embodiment of the invention where the transformer 45 has two identical windings 45a and 45b wound multifilar and connected in series in order to obtain a transformation ratio from input to output of 1:1.

Figure 11A:
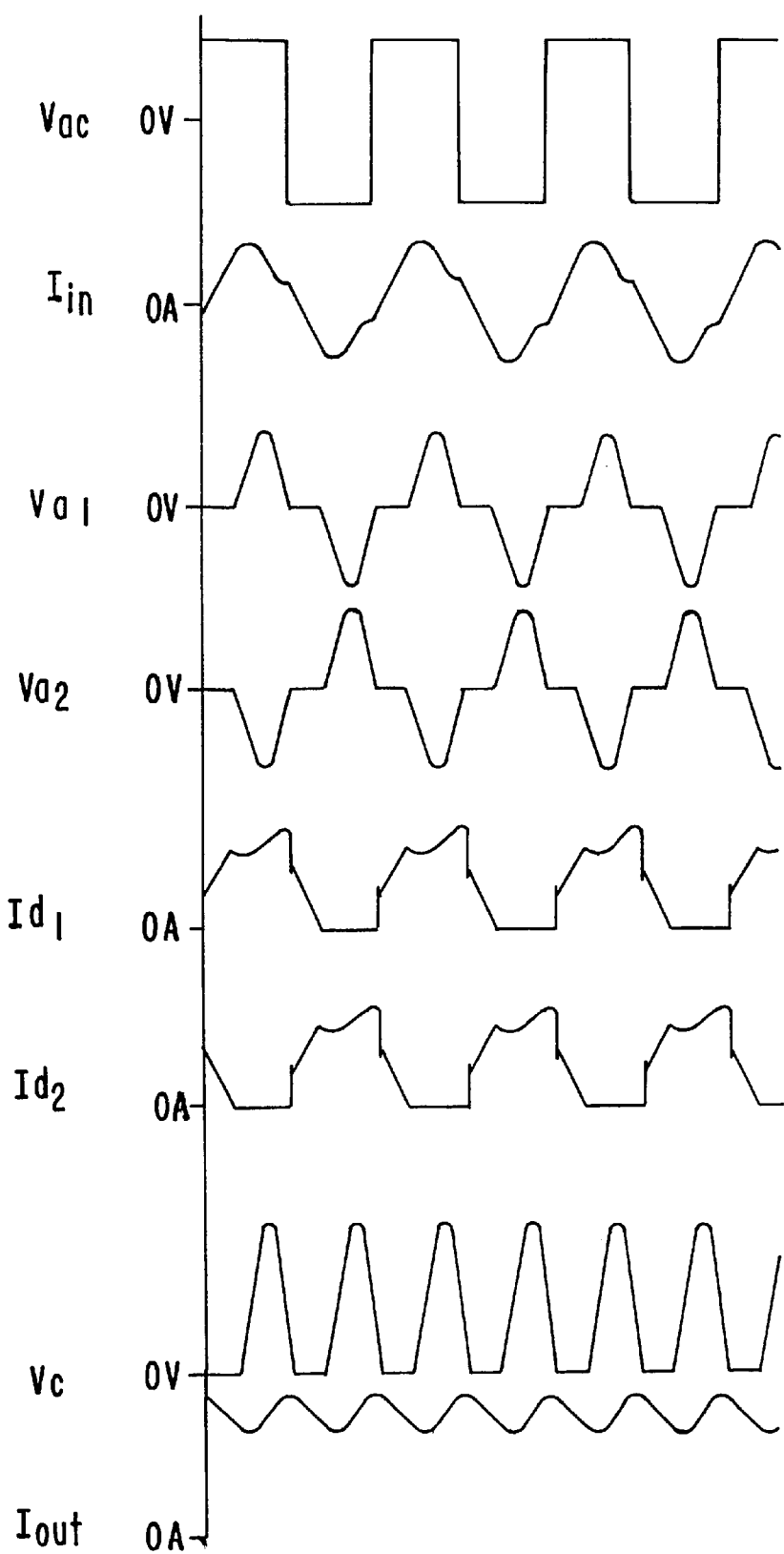
FIG. 11A shows waveforms for the signals identified for a preferred embodiment of the power regulator of the invention in accordance with FIG. 10, employing an AC voltage source with a square wave.
Figure 11B:
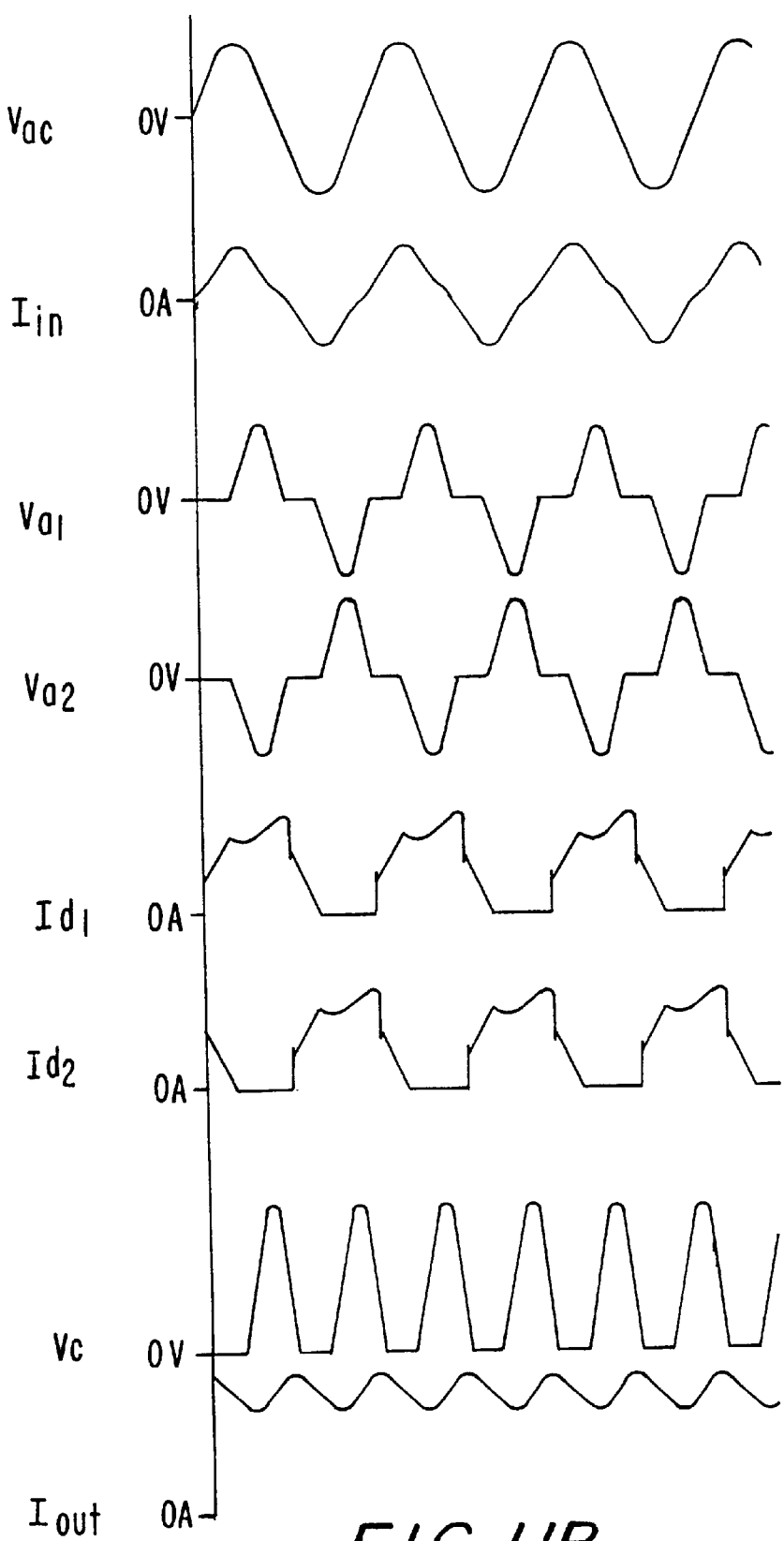
FIG. 11B shows waveforms for the signals identified for a preferred embodiment of the power regulator of the invention in accordance with FIG. 10, employing an AC voltage source with a sine wave.

FIG. 10 illustrating the sixth embodiment of the invention provides the waveforms illustrated in FIGS. 11A and 11B when the following values of the components and voltages are employed.

| | |
|---|---|
| Fac: | 700 kHz/36 Vpp square wave (or 42 Vpp sine wave) |
| L1: | 0.92 µH |
| C1: | 100 nF |
| N1/N2: | 1 |
| C2: | 4700 pF |
| L2: | 2.2 µH |
| C3: | 10 uF |
| $R_{load}$: | 1Ω |
| $V_{out}$: | 12 VDC |

FIG. 11A illustrates the waveforms obtained employing an AC voltage source with a square wave and FIG. 11B shows the waveforms obtained employing an AC voltage source with a sine wave. The actual waveform of the AC source is insignificant as long as the fundamental frequency is at the given value for Fac. The shape of the waveform from the AC source has virtually no impact on the voltages and currents obtained.

Also contemplated is a method of regulating power comprising: adjusting the correspondence between a frequency of an AC source and a resonance frequency of a first resonant circuit comprising a first inductance L1 and a first capacitance C1 connected in series to the AC source to regulate power at an output; and regulating the output voltage of the power regulator to a value lower than the voltage of the AC source when there is substantially zero current at the output. The step of regulating the output voltage lower than the voltage of the AC source when there is zero output current includes providing a second capacitance C2 connected in parallel with the output to form a second resonant circuit with the first inductance L1.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

I claim:

1. A power regulator comprising:
   an AC source having a voltage and a frequency;
   an output having an output voltage;
   a first resonant circuit comprising a first inductance and a first capacitance connected in series to said AC source, and having a first resonance frequency;
   means for adjusting the correspondence between the frequency of said AC source and the first resonance frequency of said first resonant circuit in order to regulate power; and
   means for regulating to an output voltage lower than the voltage of said AC source when there is substantially zero output current.

2. The power regulator according to claim 1, wherein said means for regulating comprises a second capacitance connected in parallel with said output to form a second resonant circuit with said first inductance.

3. The power regulator according to claim 1, wherein said means for adjusting the correspondence between the frequency of said AC source and the first resonance frequency comprises means for varying the first inductance.

4. The power regulator according to claim 1, wherein said means for adjusting the correspondence between the frequency of said AC source and the first resonance frequency comprises means for varying the capacitance.

5. The power regulator according to claim 1, wherein said means for adjusting the correspondence between the frequency of said AC source and the first resonance frequency comprises means for varying said frequency of said AC source.

6. The power regulator according to claim 1, wherein said means for regulating permits an output power of essentially zero.

7. The power regulator according to claim 1, further comprising an isolation transformer having a primary winding and at least one secondary winding; said primary winding connected in series with said first resonant circuit and said second winding operatively connected to said output of said power regulator.

8. The power regulator according to claim 2, further comprising an isolation transformer having a primary winding and at least one secondary winding; said primary winding connected in series with said first resonant circuit and said second winding operatively connected to said output of said power regulator.

9. The power regulator according to claim 7, further comprising rectifier means connected to said secondary winding of said transformer to provide a DC voltage at said output of said power regulator.

10. The power regulator according to claim 9, wherein said rectifier means includes a series inductor.

11. The power regulator according to claim 9, wherein said second capacitance is set equal to or above a minimum value.

12. The power regulator according to claim 2, wherein said second resonant circuit has a second resonance frequency and said second capacitance is set at a value which permits less than one full wave of said second resonance frequency when a momentary value of the input current is larger than the output current Iout.

13. The power regulator according to claim 9, further comprising means for slowing the transition of forward current output from said rectifier means.

14. The power regulator according to claim 13, wherein said means for slowing the transition of forward current from said rectifier means comprises a series inductor.

15. The power regulator according to claim 9, further comprising means for eliminating sharp transitions in voltage across said rectifier means.

16. The power regulator according to claim 15, wherein said means for eliminating sharp transitions in voltage across said rectifier means comprises a series inductor.

17. The power regulator according to claim 9, further comprising means for reducing recovery losses associated with said rectifier means.

18. The power regulator according to claim 17, wherein said means for reducing recovery losses comprises a series inductor.

19. The power regulator according to claim 8, wherein said second capacitance is connected across the primary winding of said transformer.

20. The power regulator according to claim 8, wherein said second capacitance is connected across said secondary winding of said transformer.

21. The power regulator according to claim 7, wherein said first resonant circuit includes the leakage inductance of said isolation transformer.

22. The power regulator according to claim 8, wherein the value of the second capacitance is set to compensate for winding capacitances of said transformer.

23. A power regulator according to claim 7, further comprising rectifier means and wherein the value of the second capacitance is set to compensate for capacitances associated with said rectifier means.

24. A power regulator according to claim 7, wherein said transformer comprises a multitude of identical windings connected in series.

25. A power regulator according to claim 24, wherein said identical windings are wound multifilar.

26. A power regulator comprising:
   an AC source having a voltage and a frequency;
   an output having an output voltage;
   a first resonant circuit comprising a first inductance and a first capacitance connected in series to said AC source, and having a first resonance frequency;
   means for adjusting the correspondence between the frequency of said AC source and the first resonance frequency of said first resonant circuit in order to regulate power; and
   a second capacitance connected in parallel with said output to form a second resonant circuit with said first inductance.

27. A method of regulating power comprising:
   regulating the output voltage of a power regulator to a value lower than the voltage of an AC source when there is substantially zero current at said output.

28. The method according to claim 27, wherein said power regulator comprises a first resonant circuit comprising a first inductance and a first capacitance and said step of regulating the output voltage lower than the voltage of the AC source when there is zero output current includes providing a second capacitance connected in parallel with said output to form a second resonant circuit with said first inductance.

* * * * *

UNITED STATES PATENT AND TRADEMARK OFFICE
CERTIFICATE OF CORRECTION

PATENT NO. : 6,181,116 B1
DATED : January 30, 2001
INVENTOR(S) : Arian M. Jansen It is certified that error appears in the above-identified patent and that said Letters Patent is hereby corrected as shown below:

<u>Column 9,</u>
Line 37, please substitute:

"$FresC2 = 1/(2\pi)(L1(C1(4)C2/(C1+4C2))))$" with $-- FresC2 = 1/(2\pi)\sqrt{(L1(C1(4)C2/(C1+4C2))))} --$ Line 43, please substitute:

"$FresC2 = 1/(4\pi(L1C2)$" with $-- FresC2 = 1/(4\pi\sqrt{L1C2}) --$

Signed and Sealed this

Nineteenth Day of March, 2002

Attest:

Attesting Officer

JAMES E. ROGAN
Director of the United States Patent and Trademark Office